United States Patent [19]
Koether et al.

[11] Patent Number: 5,171,974
[45] Date of Patent: Dec. 15, 1992

[54] HEATING SYSTEM FOR OVEN ZONE LOCATION

[75] Inventors: Bernard G. Koether, Westport; Mario Pasquini, Milford, both of Conn.

[73] Assignee: Technology Licensing Corporation, Tequesta, Fla.

[21] Appl. No.: 468,544

[22] Filed: Jan. 23, 1990

Related U.S. Application Data

[62] Division of Ser. No. 114,563, Oct. 29, 1987.

[51] Int. Cl.⁵ .............................................. H05B 1/02
[52] U.S. Cl. .................................. 219/506; 219/518; 219/487; 219/413; 340/706
[58] Field of Search ............... 219/492, 506, 507, 494, 219/483, 486, 487, 396, 398, 414, 413; 307/38-41, 117; 340/584, 706

[56] References Cited

U.S. PATENT DOCUMENTS

| | | | |
|---|---|---|---|
| 4,309,584 | 1/1982 | Terakami | 219/506 |
| 4,343,990 | 8/1982 | Ueda | 219/506 |
| 4,380,698 | 4/1983 | Butts | 219/492 |
| 4,390,965 | 6/1983 | Albert | 219/487 |
| 4,695,711 | 9/1987 | McGeorge | 219/506 |
| 4,755,646 | 7/1988 | Fowler | 219/506 |
| 4,831,239 | 5/1989 | Ueda | 219/10.55 B |

Primary Examiner—Mark H. Paschall
Attorney, Agent, or Firm—Felfe & Lynch

[57] ABSTRACT

A parameter control system for an oven which may, for example, be a baking oven or a convection oven having the capability of injecting steam into the cooking cavity. The parameter control system precisely controls cooking temperature, cooking time, humidity and air flow in the oven. The parameters can be easily and repeatably set.

4 Claims, 8 Drawing Sheets

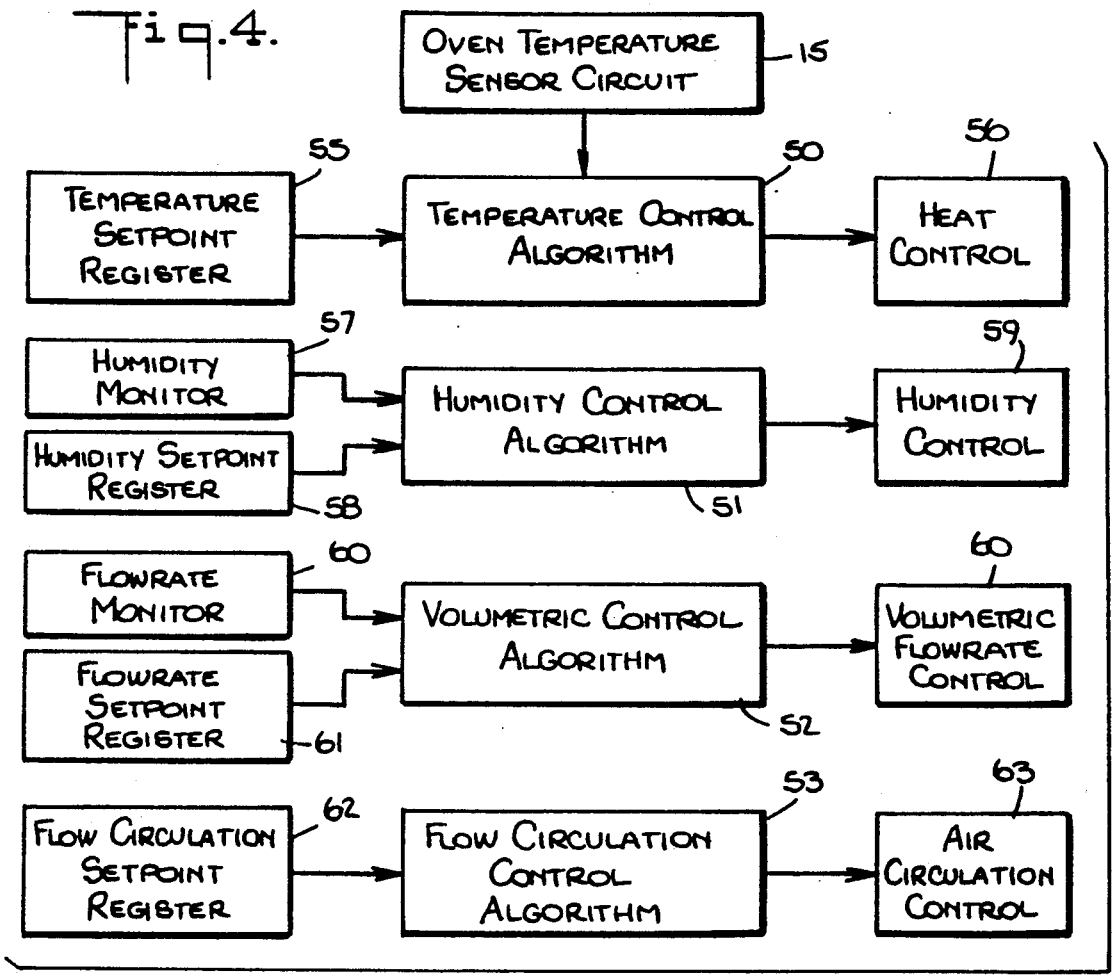
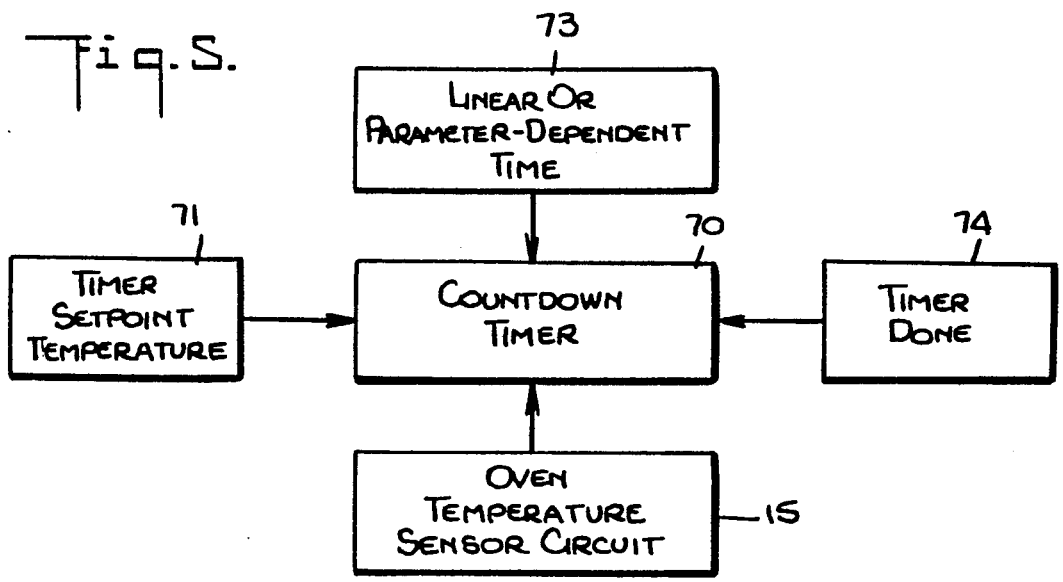

HEATING SYSTEM FOR OVEN ZONE LOCATION

This is a divisional application of application Ser. No. 114,563, filed Oct. 29, 1987.

This invention relates to a parameter control system for an oven, for example, a baking oven or, for example, a convection oven that also has the capability of injecting steam into the cooking cavity. Such convection ovens with steam-injection capability are known as combi-ovens. Baking ovens or combi-ovens can be useful in a commercial kitchen for baking, steaming, proofing (or leavening), roasting, or holding products at a serving temperature. All combinations of heat and steam are typically controlled by manual controls on the combi-oven. Baking ovens or combi-ovens may, for example, be deck ovens, tunnel ovens, ferris-wheel ovens, carousel ovens or spiral ovens.

However, controls on these combi-ovens do not lend themselves to a "fast food" or chain store use where precise control of cooking temperature, cooking time, humidity, and air flow must be easily set. Also the product quality must be repeatable for each store in the store chain.

U.S. Pat. No. 4,506,598-Meister relates to a combi-oven which has a hot air mode and also has a steam mode. A single fan circulates air during both modes. During the hot air mode a vent is open for the discharge of vapor from the oven. During the steam mode, the vent is closed and when the steam displaces air out of the cooking chamber, the steam emerges out of the cooking space through a connection conduit. A control is actuated in accordance with a program during the hot air mode to control the position of a discharge pipe and a juice outflow pipe.

It is an object of the present invention, therefore, to provide a new and improved parameter control system for an oven for heating a food product.

It is another object of the invention to provide a new and improved parameter control system for a combi-oven for precisely controlling cooking temperature, cooking time, humidity and air flow in the oven.

It is another object of the invention to provide a new and improved parameter control system for an oven in which the parameters can be easily and repeatably set.

In accordance with the invention, a parameter control system for an oven for heating a food product comprises means for heating a heating medium in the oven and programmed means for controlling as a first parameter the temperature of the heating medium. The control system also includes programmed means for controlling as a second parameter the volumetric flow rate of the heating medium and programmed means for controlling one or more time intervals for predetermined values of the temperature and volumetric flow rate of the heating medium in the oven.

Also in accordance with the invention a heating system for an oven comprises a plurality of product selection keys which upon one actuation of a first key selects at least one heating parameter for a given product and which upon another actuation of the first key indicates an oven location for the given product.

Also in accordance with the invention, a parameter control system for an oven for heating a food product comprises means for heating medium in the oven and programmed means for controlling as a first parameter the temperature of the heating medium. The system also includes programmed means for controlling as a second parameter the humidity of the heating medium and programmed means for controlling one or more time intervals for predetermined values of the temperature and humidity of the heating medium.

Also in accordance with the invention, a parameter control system for an oven for heating a food product comprises means for heating a heating medium in the oven and programmed means for controlling as a first parameter the temperature of the heating medium. The system also includes programmed means for controlling as a second parameter the circulation of the heating medium and programmed means for controlling one or more time intervals for predetermined values of the temperature and circulation of the heating medium.

Also in accordance with the invention, a parameter control system for an oven for heating a food product comprises means for heating a heating medium in the oven and means for controlling a first parameter of a heating medium. The system also includes means for controlling one or more time intervals for a predetermined value of the first parameter in which any of the time intervals is dependent on the measured value of the first parameter.

For a better understanding of the present invention together with other and further objects thereof, reference is made to the following description, taken in connection with the accompanying drawings, and its scope will be pointed out in the appended claims.

Referring now to the drawings:

FIG. 1 is a schematic diagram representing a parameter control system in accordance with the invention;

FIGS. 2-5, inclusive, are flow charts comprising schematic representations of a portion of a microcomputer which operates according to computer programs produced according to the flow charts.

FIG. 8 is a schematic diagram of an example of a closed-loop humidity control apparatus;

Figure 1:
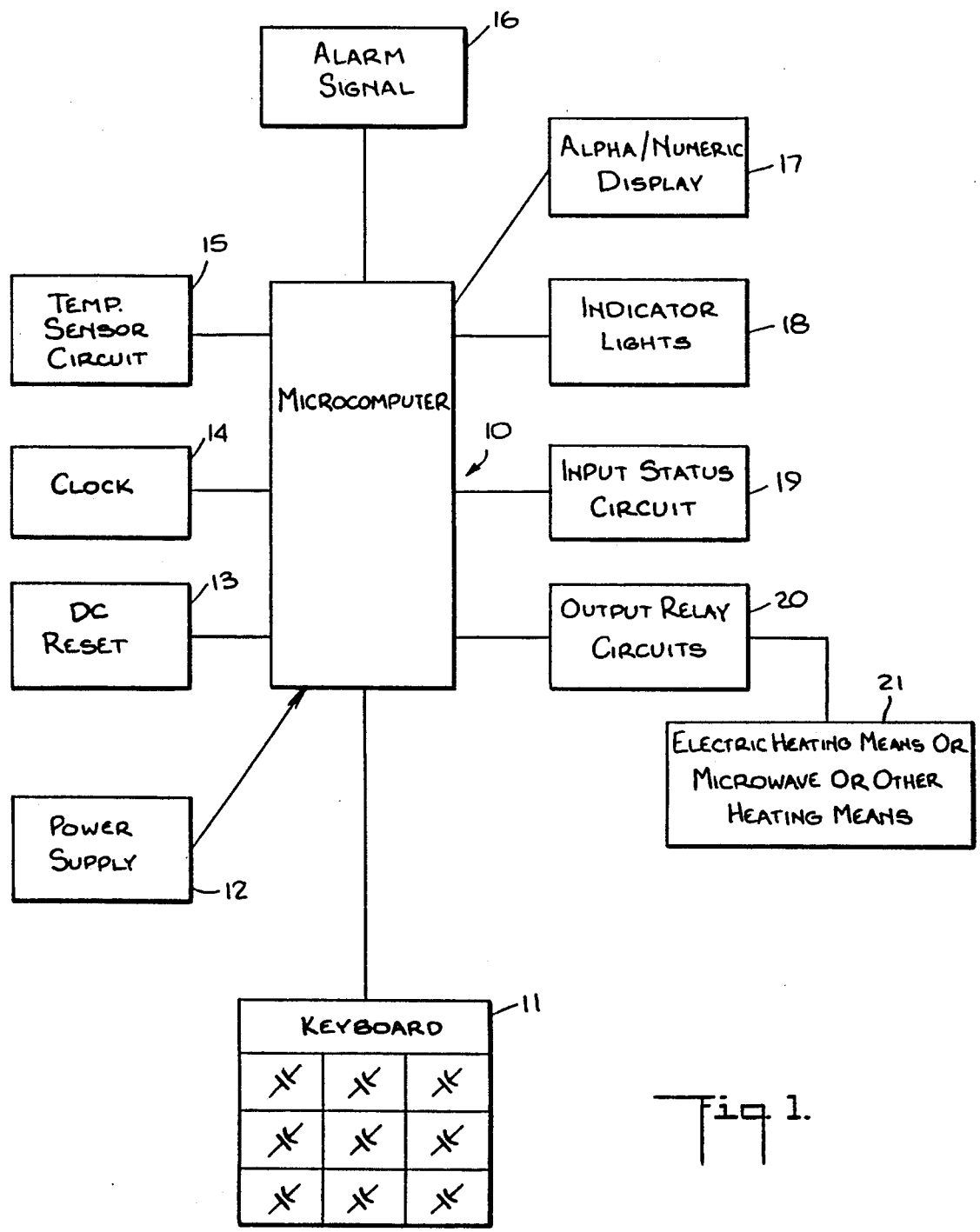

Before referring to the drawings in detail, it will be understood that for purposes of clarity, the apparatus represented in block diagrams of FIGS. 2-5 and 7 utilize, for example, an analog-to-digital converter and a microprocessor which includes such hardware as a central processing unit, program and random access memories, timing and control circuitry, input-output interface devices and other digital subsystems necessary to the operation of a central processing unit as is well understood by those skilled in the art. The microprocessor operates according to the corresponding computer program produced according to the corresponding flow chart represented in the drawings.

Referring now more particularly to FIG. 1 of the drawings, a microcomputer 10 includes a central processing unit which receives an input from a keyboard 11 which may, for example, comprise a capacitive keyboard.

The apparatus includes a conventional power supply 12, a reset circuit 13 for resetting the microcomputer when renewing power in the power supply, a clock oscillator 14 for providing clock pulses to the microcomputer 10, a temperature sensor circuit 15 for sensing the temperature when in the cooking apparatus, an audible alarm 16, an alpha/numeric display 17 and indicator lights 18. The apparatus also includes an input status circuit 19 which may, for example, be responsive to a door switch (not shown). The microcomputer controls output relay circuits 20 which may, for example, control electric or other heating means 20 of the oven.

Figure 2:
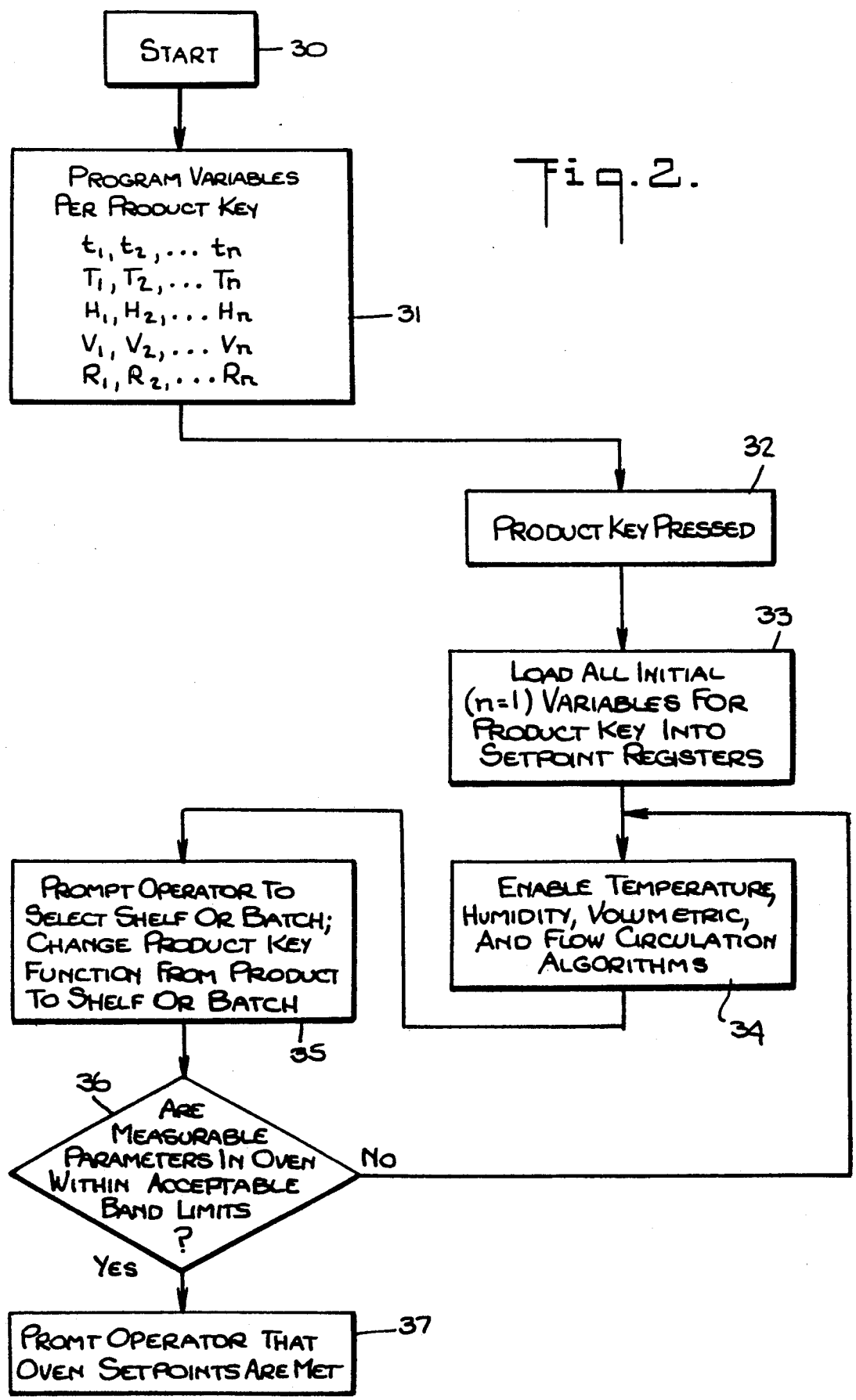

Referring now more particularly to FIG. 2 of the drawings. When the start key 30 is actuated, the program parameter variables per product key, for example, time interval $t_1, t_2, \ldots t_n$, temperature $T_1, T_2, \ldots T_n$, humidity $H_1, H_2, \ldots H_n$, volumetric flow rate $V_1, V_2, \ldots V_n$ and flow circulation $R_1, R_2, \ldots R_n$, are determined. It will be understood that where $t_n$ represents a time interval, $T_n$ equals the temperature setting for the time interval $t_n$, $H_n$ equals the humidity setting for the time interval $t_n$, $V_n$ equals the volumetric flow rate for time interval $t_n$, $R_n$ equals the direction of flow circulation (left or right) for the time interval $t_n$ and n equals 1, 2, 3 . . . n to the number of intervals. When a first product key is pressed, a "product key pressed" microprocessor portion 32 is coupled to a "load all initial (n=1) variables for product key into setpoint registers" microprocessor portion 33.

The microprocessor portion 33 is coupled to an "enable temperature, humidity, volumetric and flow circulation algorithms" microprocessor portion 34.

The microprocessor portion 34 is coupled to a "prompt operator to select shelf or batch and change product key function from product to shelf or batch" microprocessor portion 35. The microprocessor portion 35 is coupled to an "are measured parameters in oven within acceptable band limits" microprocessor portion 36. The "no" output of the microprocessor portion 36 is coupled to the input of the microprocessor portion 34. The "yes" output of the microprocessor portion 36 is coupled to a "prompt operator that oven setpoints are met" microprocessor portion 37.

Figure 3:
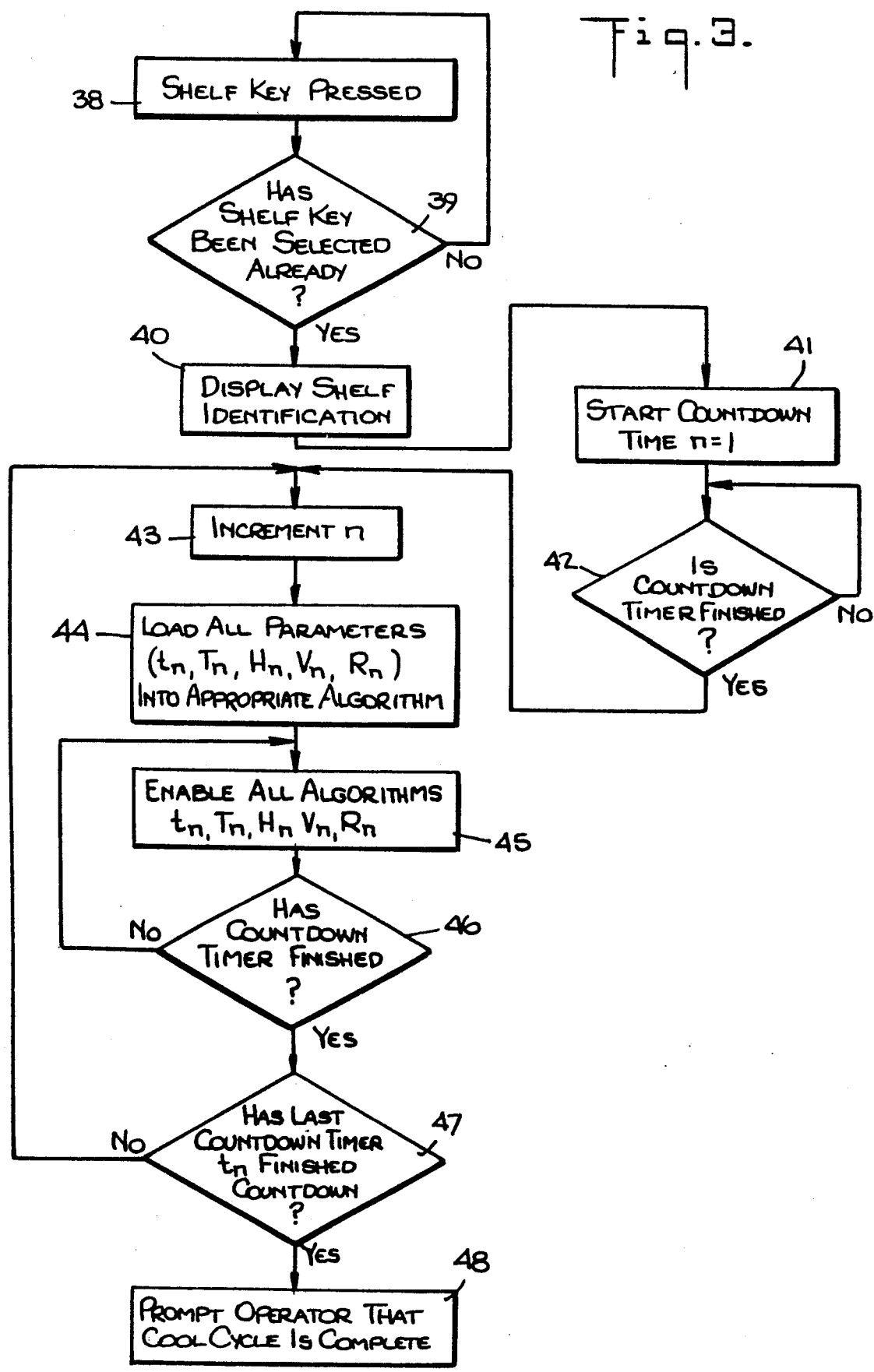

The operator then presses a shelf key as represented by "shelf key pressed" microprocessor portion 38 in FIG. 3 which is, for example, the second pressing of the originally pressed product key. A microprocessor portion "has shelf key been selected already?" has a "no" output coupled to the input of the microprocessor portion 38. The microprocessor portion 39 has a "yes" output coupled to a "display shelf identification" microprocessor portion 40. The output of the "display shelf identification" microprocessor portion 40 is coupled to a "start countdown timer n=1" microprocessor portion 41 which is coupled to an "is countdown timer finished" microprocessor portion 42. The "no" output of the microprocessor portion 42 is coupled to the input of the microprocessor portion 42 and the "yes" output of the microprocessor portion 42 is coupled to an "increment n" microprocessor portion 43.

The microprocessor portion 43 is coupled to a "load all parameters ($t_n, T_n, H_n, V_n, R_n$) into appropriate algorithm" microprocessor portions which are individually represented in FIG. 5 as "countdown timer" microprocessor portion 70 and in FIG. 4 as "temperature control algorithm" microprocessor portion 50, "humidity control algorithm" microprocessor portion 51, "volumetric control algorithm" microprocessor portion 52, and "flow of circulation control algorithm" microprocessor portion 53.

The microprocessor portion 44 is coupled to an "enable all algorithms $t_n, T_n, H_n, V_n, R_n$" microprocessor portion 45 where $t_n$ at this portion represents all timers after timer $t_1$.

The microprocessor portion 45 is coupled to a "has $t_n$ countdown timer finished?" microprocessor portion 46. The "no" output of the microprocessor portion 46 is coupled to the input of the microprocessor portion 45. The "yes" output of the microprocessor portion 46 is coupled to an "has last countdown timer $t_n$ finished countdown?" microprocessor portion 47. The "no" output of the microprocessor portion 47 is coupled to the input of the "increment n" microprocessor portion 43. The "yes" output of the microprocessor portion 47 is coupled to a "prompt operator that cook cycle is complete" microprocessor portion 48.

Referring now more particularly to FIG. 4 of the drawings, the temperature control algorithm, for example, may be a complex algorithm having different temperatures at different time intervals or may be a relatively simple control algorithm having a constant temperature over the heating or cooking period. In the event that the temperature control algorithm can be represented by a constant temperature over a predetermined time interval for a first product upon depression of a first product key, and in the event that upon depression of a second product key a temperature control algorithm for a second product has the same temperature for a predetermined shorter time interval, then after the first key has been pressed twice and the product has been selected and the shelf has been selected, the second product key can be pressed twice to indicate the shelf for a second product to be heated or cooked during a portion of the same time interval as the first product.

An oven temperature sensor circuit 15 and a temperature setpoint register 55 are coupled to the input of the "temperature control algorithm" microprocessor portion 50 for effecting a heat control through a suitable heat control portion 56, which may, for example, be a closed loop electric heat control. The temperature control algorithm will be explained more fully subsequently.

In a similar manner a humidity monitor 57 and a humidity setpoint register 58 are coupled to a "humidity control algorithm" microprocessor portion 51 for effecting humidity control as represented by a suitable humidity control portion 59. This may be accomplished, for example, through a closed loop steam injection control.

A flow rate monitor 60 and a flow rate setpoint register 61 are coupled to a "volumetric control algorithm" microprocessor portion 52 for effecting volumetric flow rate control as represented by portion 60. This may be accomplished, for example, by closed loop adjustment of a fan motor speed or closed loop adjustment of a duct aperture or closed loop adjustment of the axial position of a fan or a plurality of fans. Also, the axial position of a fan may be empirically determined for control by a servomotor.

The closed loop adjustment of the fan motor speed may, for example, utilize a hot air duct and a flutter plate having an angular position determined by the volumetric flow and controlling the rotary position of a potentiometer which controls a variable-speed motor control for the fan.

A flow circulation setpoint register 62 is coupled to a flow circulation control algorithm microprocessor portion 53 for effecting air circulation control represented by block 63. This may be effected, for example, by reversing the rotational direction of a constant-speed or variable-speed fan. This fan may be the same fan as utilized in the humidity control portion 59 and the volumetric flow rate control portion 60.

Referring now more particularly to FIG. 5 of the drawings, a typical "countdown timer" microprocessor portion 70 is represented. A "timer setpoint temperature" microprocessor portion 71 feeds a setpoint temperature to the timer. An oven temperature sensor circuit 15 feeds the actual oven temperature to the timer. A "linear or parameter-dependent time" microprocessor portion 73 also applies an input to the timer. When the timer has counted down to zero, the microprocessor portion 70 actuates a "timer done" portion 74.

Figure 6:
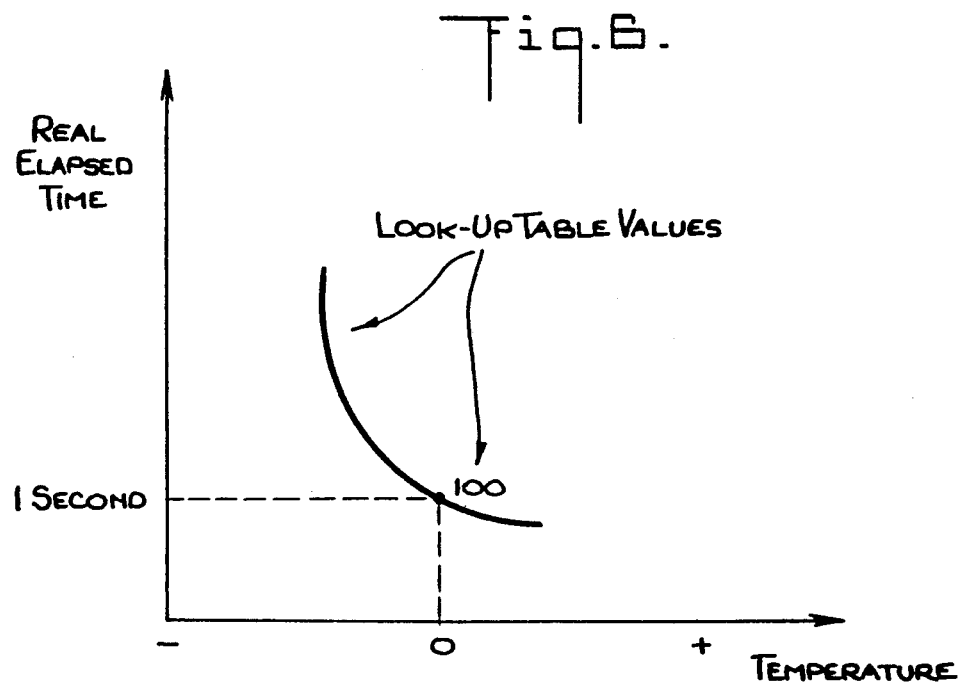
FIG. 6 is a graph representing a selected temperature difference vs. elapsed time characteristic of the cooking apparatus.
Figure 7:
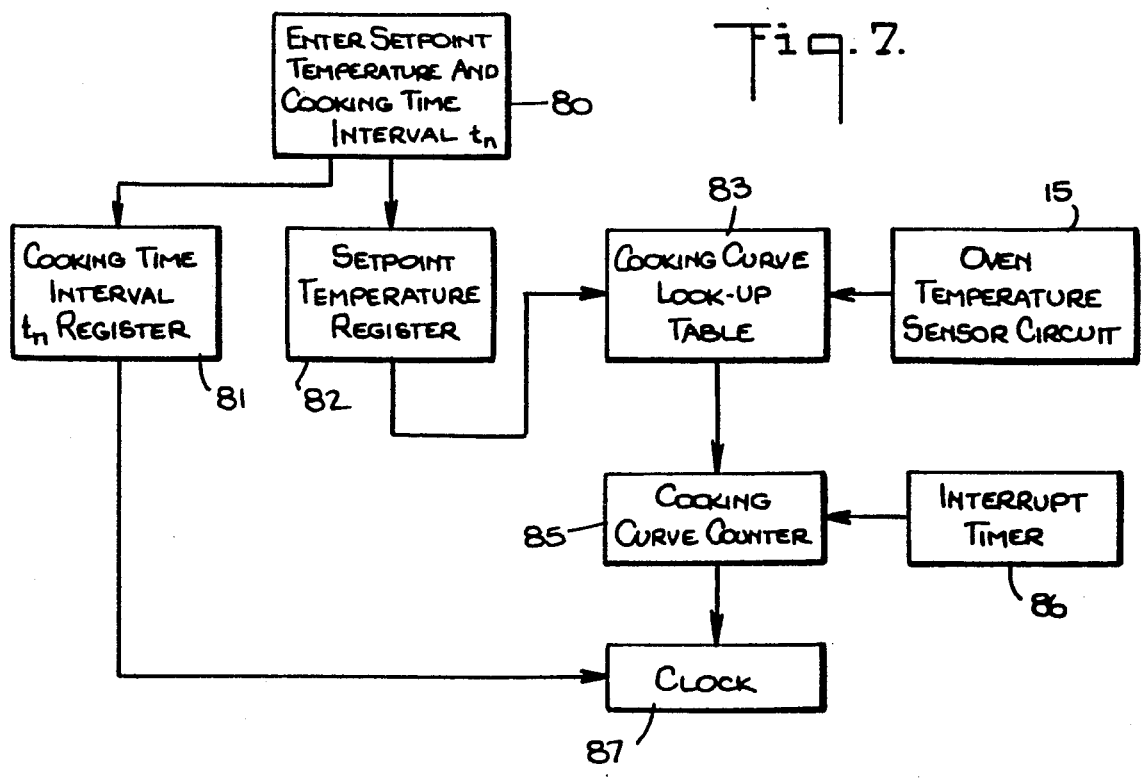
FIG. 7 is a flow chart comprising a schematic representation of a portion of a microcomputer which operates according to a computer program produced according to the flow chart.
Figure 6:
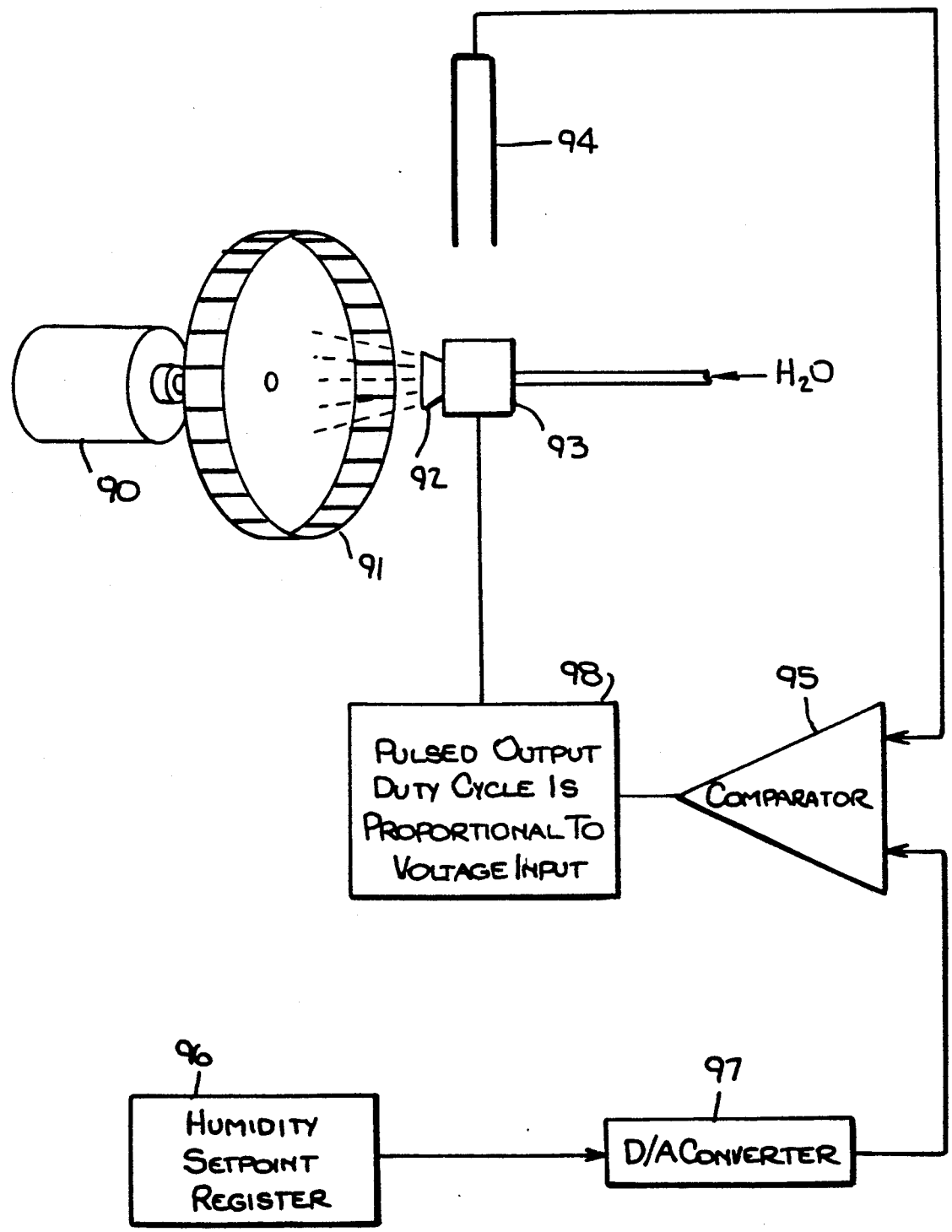

Referring now more particularly to FIG. 6 of the drawings there is represented a cooking curve, for example, for baking a suitable food product such as bread rolls. This cooking curve may be empirically determined for each cooking product. The empirical data is represented in a look-up table with 100 being equal to real time or no adjustment. With reference to FIG. 7, an "enter setpoint temperature and cooking time interval $t_n$" microprocessor portion 80 is coupled to a "cooking time interval $t_n$" register 81 and to a "setpoint temperature" register 82. The register 81 is coupled to a clock 87 to set the clock for countdown. The output of the "setpoint temperature" register 82 is coupled to a "cooking curve look-up table" microprocessor portion 83 which may contain the data represented by the graph of FIG. 6. The "oven temperature sensor circuit" 15 is also coupled to the microprocessor portion 83. A "cooking curve counter" microprocessor portion 85 is loaded with a value from the curve look-up table 83. The value in the look-up table is determined by measuring the difference between the actual oven temperature and the setpoint temperature (desired cooking temperature). If the actual temperature is below the setpoint temperature, the negative difference means a longer time than the real time interval $t_n$ is required for cooking to reach the setpoint temperature. The microprocessor includes an interrupt timer 86 which trips 100 times per second, for example. The interrupt timer decrements the cooking curve counter 85, for example, 100 times per second and thus with the actual temperature equal to the setpoint temperature, the cooking curve counter will reach zero once every second. When the curve counter reaches zero it decrements one second off the clock 87 which is timing the product. Thus the cooking time is parameter-dependent, for example, temperature-dependent.

Referring to FIGS. 5 and 7, the "linear or parameter-dependent time" microprocessor portion 73 and the "countdown timer" microprocessor portion 70 preferably include, for example, the "cooking curve look-up table" microprocessor portion 83, the "cooking curve counter" microprocessor portion 85, the "interrupt timer" microprocessor portion 86, and the clock 87.

Referring now more particularly to FIG. 8 of the drawings, a motor 90 rotates an air-movement device 91 which could, for example, be a squirrel cage fan. Steam may, for example, be injected by a solenoid-controlled injector 92 under the control of solenoid 93 and moved by the fan 91. A humidity sensor 94 senses the humidity in the oven and applies a corresponding electrical signal to a comparator 95. A humidity setpoint register 96 applies an electrical signal representing the desired humidity to a digital-to-analog converter 97 for application to the comparator 95. A pulsing circuit 98 having a pulsed output duty cycle proportional to the voltage input which represents the difference between the output signal of the humidity sensor 94 and the output signal of the digital-to-analog converter 97 controls the operation of the solenoid 93 which controls a suitable valve in the steam injector 92.

Figure 9:
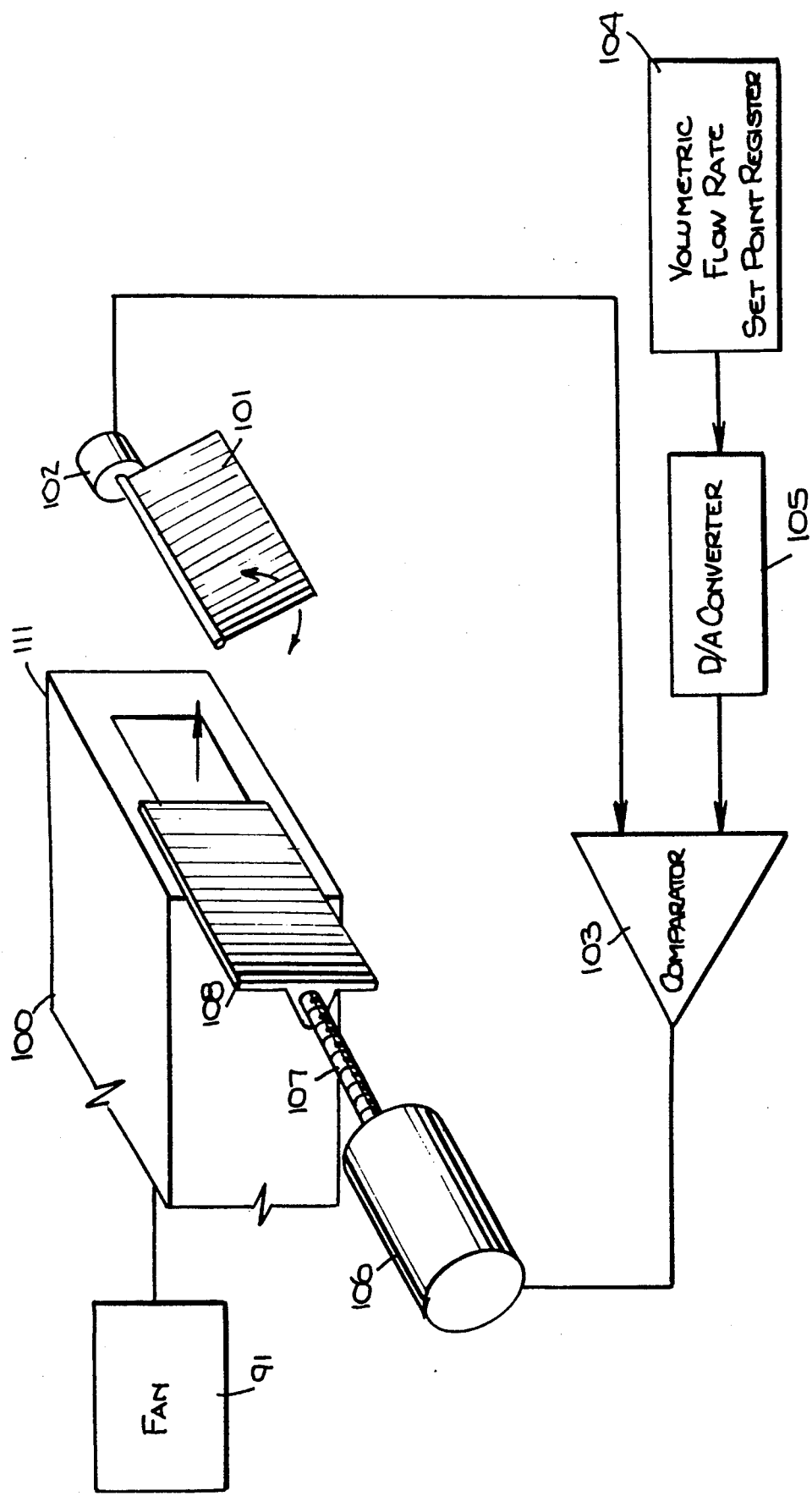
FIG. 9 is a schematic diagram of an example of closed loop volumetric flow control apparatus.

Referring now more particularly to FIG. 9, a hot air duct 100 supplies inside air or outside air or a combination of both as hot air toward a flutter plate 101 which rotates a potentiometer 102 in accordance with the position of the flutter plate. The position of the flutter plate depends on the volumetric flow rate of hot air against the flutter plate directed by a fan 91. The output signal of the potentiometer 102 is applied to comparator 103 and a volumetric flow rate setpoint register 104 applies a digital signal representing the desired flow rate to a digital-to-analog converter 105 which applies its output signal to the comparator 103. The output signal of the comparator 103 representing the difference between the signals from the potentiometer 102 and the converter 105 is applied to a D.C. motor 106 to control the amount and direction of rotation thereof. A lead screw 107 is coupled to the shaft of the D.C. motor 106 for positioning the baffle gate 108 to open or close the hot air duct 111 in accordance with the setpoint of volumetric flow rate setpoint register.

Figure 10:
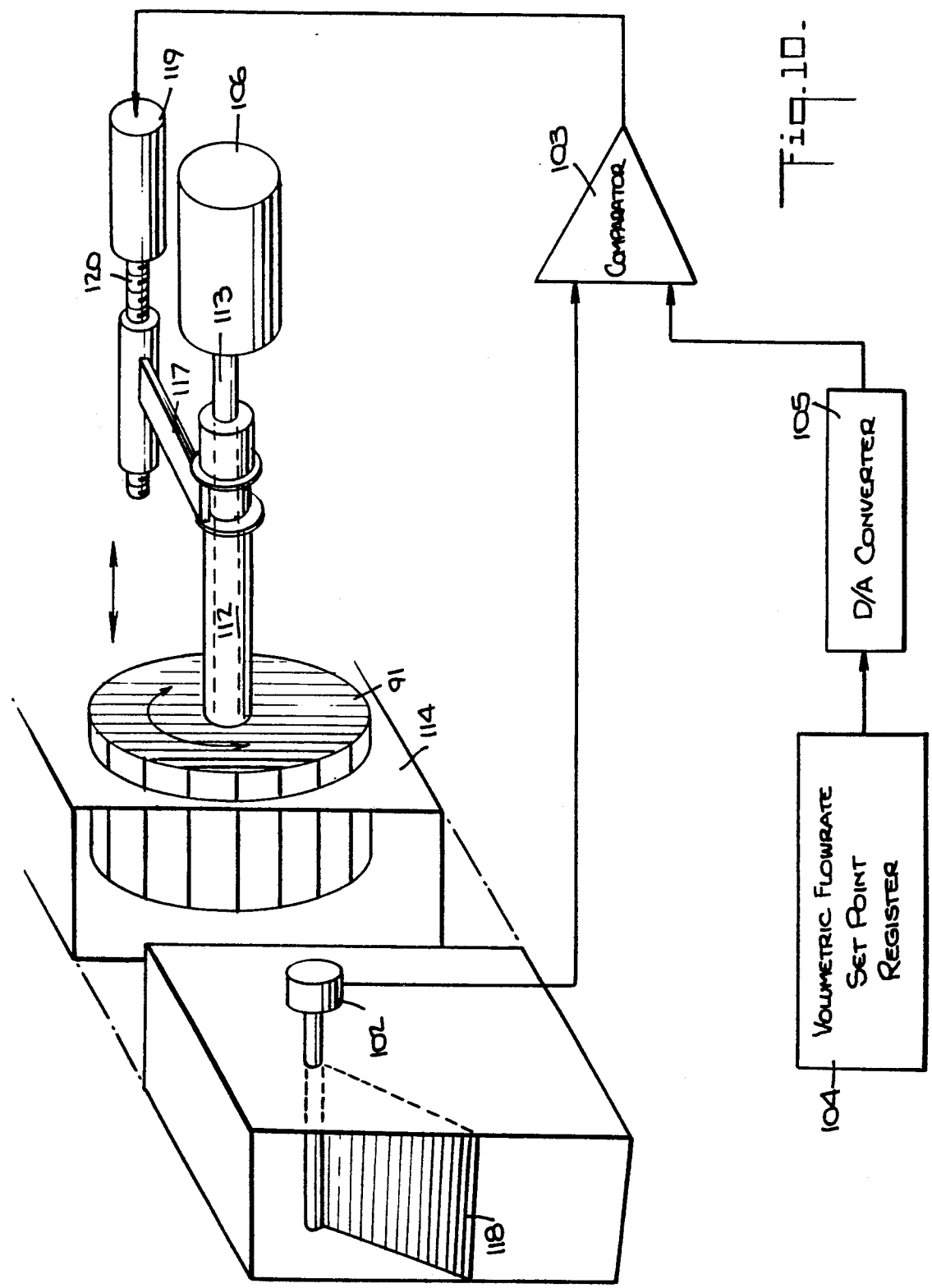
FIG. 10 is a schematic diagram of another example of closed loop volumetric flow control apparatus.

Referring now more particularly to FIG. 10, another volumetric flow rate control is represented. A hot air duct 114 supplies hot air toward or away from a flutter plate 118 depending on the direction of rotation of a squirrel cage fan 91 which is axially displaceable into and away from the hot air duct 114. The position of the flutter plate 118 depends on the volumetric flow rate of hot air against the flutter plate directed by the fan 91. The fan 91 can be withdrawn from the duct with the effect that as the fan is withdrawn less of the fan is in the hot air path and the volumetric flow rate becomes smaller. The fan shaft 112 is concentric with a motor shaft 113. A locking device, for example, a spline (not shown) allows the motor shaft 113 to turn the fan shaft 112 while allowing the fan to be withdrawn from the duct. The fan motor 106 preferably turns the fan at a constant speed. As the fan rotates, the fan may be withdrawn from or inserted into the duct by means of a slide lever 117 moved back and forth by an actuator motor 119 having a lead screw 120. The actuating motor 119 can rotate clockwise and counter-clockwise.

In a closed loop system, the volumetric flow positions a flutter plate 118 which rotates a potentiometer 102 to convert the angular position of the flutter plate into a voltage. The voltage is applied to a comparator 103. A digital volumetric flow rate parameter value is applied from a loaded volumetric flow rate setpoint register 104 to a digital-to-analog converter 105 which is also coupled to the comparator 103. If the two input voltages to the comparator are not the same, the output of the comparator will be positive or negative as determined by the input voltages. The actuator motor 119 is driven by the output signal of the comparator 103 and moves counter-clockwise or clockwise, either to withdraw the fan or insert the fan in the duct. The flutter plate in turn rises as the fan is inserted due to the greater volumetric flow or falls as the fan is withdrawn until the two input voltages to the comparator are equal. This occurs for only one position of the flutter plate for a given volumetric flow rate value from the setpoint register 104 and digital-to-analog converter 105. Thus the flow rate can be set to any programmed input loaded into the register 104.

Occasionally products that are being baked have a consistency which is sensitive to high velocity air flow, i.e., as the product rises, its form is not yet solid. A high velocity fan will blow the product, causing an asymmetric and unpleasing aesthetic appearance. One way of controlling the aesthetic appearance is by setting the volumetric flow rate at a sufficiently low value not to disturb the product. Two examples of the adjustment of the volumetric flow rate have been described in connection with FIGS. 9 and 10.

Another way to control the aesthetic appearance and prevent skewing of the form of the product is to alternate the hot air flow circulation. This can be done by alternately changing direction of rotation of the fan.

The heating system may also be structured to include programmed microprocessor portions such that upon at least one of a plurality of actuations of the first product selection key, the heating system selects at least one parameter, for example, temperature, for a batch of a given product and so that upon another actuation of the first product selection key indicates an oven location for the batch of the given product. Thus, the product selection key may be actuated, for example, three times, and the first two actuations select the same temperature for two batches of a given product placed at different locations. Then, for example, the third actuation of the product selection key causes the heating system to indicate the oven locations for the batches of the given product.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A heating system for an oven comprising:
   a plurality of oven zone locations in a single oven in which a plurality of heating operations can take place;
   a plurality of product selection keys which upon one actuation of a first key selects at least one heating parameter for a given product and which upon another actuation of a key indicates a specific oven zone location for placing the given product prior to heating.

2. A heating system in accordance with claim 1 in which said heating parameter is temperature.

3. A heating system for an oven comprising:
   a plurality of oven zone locations in a single oven in which a plurality of heating operations can take place;
   a plurality of product selection keys which upon at least one of a plurality of actuations of a first key selects at least one heating parameter for a batch of a given product and which upon another actuation of said first key indicates a specific oven zone location for the batch of the given product.

4. A heating system for an oven comprising:
   a plurality of oven zone locations in a single oven in which a plurality of heating conditions can take place;
   a plurality of product selection keys which upon one actuation of a first key selects at least one heating parameter for a given product and which upon another actuation of a key indicates a specific oven zone location for the given product to be placed and in which upon one actuation of a second of said plurality of product selection keys selects said at least one heating parameter at the same value for a second given product and which upon another actuation of the second key indicates another specific oven zone location for the second given product to be placed.

* * * * *